United States Patent
Gamsa et al.

(10) Patent No.: US 10,152,565 B2
(45) Date of Patent: Dec. 11, 2018

(54) METHODS FOR PERFORMING REGISTER RETIMING OPERATIONS INTO SYNCHRONIZATION REGIONS INTERPOSED BETWEEN CIRCUITS ASSOCIATED WITH DIFFERENT CLOCK DOMAINS

(71) Applicant: Altera Corporation, San Jose, CA (US)

(72) Inventors: Benjamin Gamsa, Toronto (CA); Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 575 days.

(21) Appl. No.: 14/730,082

(22) Filed: Jun. 3, 2015

(65) Prior Publication Data
US 2016/0357899 A1    Dec. 8, 2016

(51) Int. Cl.
*G06F 17/50*    (2006.01)

(52) U.S. Cl.
CPC ........ *G06F 17/5054* (2013.01); *G06F 17/505* (2013.01); *G06F 2217/84* (2013.01)

(58) Field of Classification Search
CPC ............................ G06F 17/505; G06F 17/5054
See application file for complete search history.

(56) References Cited

U.S. PATENT DOCUMENTS

| | | |
|---|---|---|
| 4,110,697 A | 8/1978 | Wilcox |
| 6,958,627 B2 | 10/2005 | Singh et al. |
| 7,120,883 B1 * | 10/2006 | van Antwerpen .. G06F 17/5045 716/102 |
| 7,203,919 B2 | 4/2007 | Suaris et al. |

(Continued)

OTHER PUBLICATIONS

Mike Hutton: "WP-01231-1.0: Understanding How the New HyperFlex Architecture Enables Next-Generation High-Performance Systems", Apr. 30, 2015 (Apr. 30, 2015), pp. 1-11. Retrieved from the Internet: URL:https://www.altera.com/en_US/pdfs/literature/wp/wp-01231-understanding-hot-hyperflex-architecture-enables-high-performance-systems.pdf [retrieved on Jul. 28, 2016].

(Continued)

*Primary Examiner* — Vuthe Siek
*Assistant Examiner* — Aric Lin
(74) *Attorney, Agent, or Firm* — Jason Tsai

(57) ABSTRACT

Circuit design computing equipment may perform register retiming operations to improve the performance of a circuit design after having performed placement and routing operations. For example, the circuit design computing equipment may perform register retiming operations that move registers from a first portion of a circuit design that operates in a first clock domain into a synchronization region that separates the first portion of the circuit design from a second portion of the circuit design that operates in a second clock domain that is different than the first clock domain. Performing register retiming operations that move registers into a synchronization region between clock domains may solve the so-called short path—long path problem in which a long (Continued)

path that would benefit from a register retiming operation is coupled in parallel to a short path that has no location to receive a register during the register retiming operation.

19 Claims, 13 Drawing Sheets

(56) References Cited

U.S. PATENT DOCUMENTS

| | | |
|---|---|---|
| 7,620,798 B1 | 11/2009 | French et al. |
| 7,917,736 B1 | 3/2011 | French et al. |
| 7,917,793 B2 | 3/2011 | Chou et al. |
| 8,423,939 B1 * | 4/2013 | Hurst .................... G06F 17/505 703/19 |
| 2007/0288874 A1 | 12/2007 | Czeck et al. |
| 2013/0297278 A1 | 11/2013 | Narayanaswamy et al. |
| 2014/0157218 A1 | 6/2014 | Gu et al. |

OTHER PUBLICATIONS

Albrecht et al., "Register Transformations with Multiple Clock Domains" In: "Correct Hardware Design and Verification Methods", Aug. 24, 2001 (Aug. 24, 2001), Springer Berlin Heidelberg, vol. 2144, pp. 126-139,. DOI: 10.1007/3-540-44798-9_11 ISSN: 0302-9743 ISBN: 978-3-540-44798-6.

* cited by examiner

METHODS FOR PERFORMING REGISTER RETIMING OPERATIONS INTO SYNCHRONIZATION REGIONS INTERPOSED BETWEEN CIRCUITS ASSOCIATED WITH DIFFERENT CLOCK DOMAINS

BACKGROUND

This relates to integrated circuits and, more particularly, to performing register retiming operations during implementation of an integrated circuit design.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which have led to performance increases.

To further increase the performance, solutions such as register retiming have been proposed, where registers are moved among portions of combinational logic, thereby achieving a more balanced distribution of delays between registers and thus potentially a higher clock frequency at which the integrated circuit may be operated.

However, performing register retiming before placement operations is based on an estimation of anticipated delays (i.e., the estimation is based on the number of combinational logic gates between registers in the pre-placement circuit design) and may lead to suboptimal register retiming solutions in terms of actual delays between registers.

Similarly, performing register retiming before routing operations is based on an estimation of anticipated delays (i.e., the estimation is based on the Manhattan distance between registers in the placed circuit design) and may lead to suboptimal register retiming solutions in terms of actual delays between registers caused by longer routes due to routing blockages.

Performing register retiming after placement or after routing operations may require an update of the previously determined placement solution or the previously determined placement and routing solution, respectively.

SUMMARY

In accordance with certain aspects of the invention, a circuit design computing equipment may receive a circuit design description with a synchronization region. The synchronization region may couple a first portion of the circuit design description that operates in a first clock domain to a second portion of the circuit design description that operates in a second clock domain that is different than the first clock domain. The circuit design computing equipment may perform a register retiming operation that moves a register from the first portion of the circuit design description into the synchronization region.

It is appreciated that the present invention can be implemented in numerous ways, such as a process, an apparatus, a system, a device, or a method on a computer readable medium. Several inventive embodiments of the present invention are described below.

In certain embodiments, the above-mentioned register may be assigned to a pipelined routing resource in the first portion of the circuit design description and the circuit design computing equipment may perform the register retiming operation by setting the pipelined routing resource to operating in non-pipeline mode. If desired, the circuit design computing equipment may switch another pipelined routing resource in the synchronization region from operating in non-pipeline mode to operating in pipeline register mode.

In some embodiments, the circuit design computing equipment may form a synchronization chain prior to performing the register retiming operation by placing additional registers of the first portion of the circuit design description between the first portion of the circuit design description and the synchronization region. The second portion of the circuit design description may send signals to the first portion of the circuit design description; and the synchronization chain may perform metastability handling of these signals. The circuit design computing equipment may preserve the metastability handling during execution of the register retiming operation by moving the register from the first portion of the circuit design description into the synchronization region without altering the synchronization chain.

Further features of the invention, its nature and various advantages, will be more apparent from the accompanying drawings and the following detailed description of the preferred embodiments.

DETAILED DESCRIPTION

The present embodiments relate to integrated circuits and, more particularly, to performing register retiming operations during the implementation of an integrated circuit design.

As mentioned above, in the Background section, performing register retiming before placement operations and/or before routing operations is based on an estimation of anticipated delays and may lead to suboptimal register retiming solutions in terms of actual delays between registers, whereas performing register retiming after placement or after routing may rely on more accurate timing information. However, performing register retiming after placement or after routing operations may result in a so-called short path—long path problem in which a long path would benefit from a register retiming operation that cannot be performed because the short path that is parallel to the long path has no location to receive a register during the register retiming operation. As a result of creating a space in the short path, a register retiming operation may require an update of the previously determined placement solution or the previously determined placement and routing solution, respectively. In some cases, updating the placement and/or the routing solution may invalidate the timing information that triggered the original decision to perform a register retiming operation to fix the short path—long path problem. As a result, the register retiming operation may encounter a different short path—long path problem, which may negate the benefit of adding a space for the register in the original short path.

In some instances, synchronization regions between clock domains may have available locations to receive a register during register retiming operations, thereby avoiding an update of the previously determined placement solution or the previously determined placement and routing solution. It may therefore be desirable to perform register retiming operations by moving registers into those synchronization regions between clock domains.

It will be recognized by one skilled in the art, that the present exemplary embodiments may be practiced without some or all of these specific details. In other instances, well-known operations have not been described in detail in order not to unnecessarily obscure the present embodiments.

Figure 1:
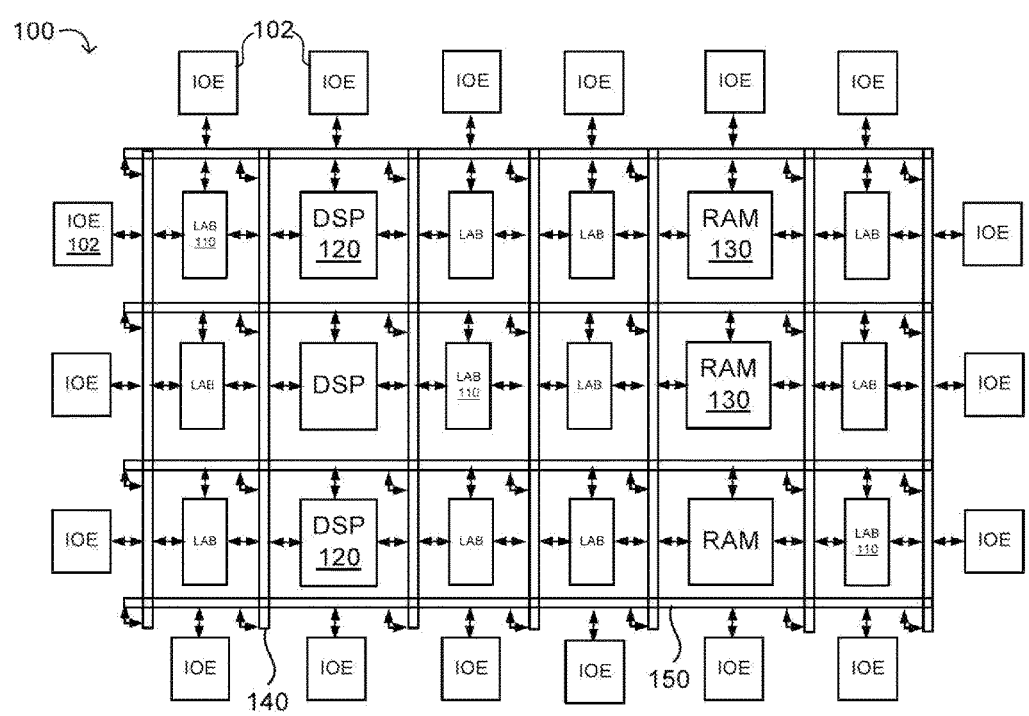
FIG. 1 is a diagram of an illustrative integrated circuit in accordance with an embodiment.

An illustrative embodiment of an integrated circuit such as programmable logic device (PLD) 100 that may be configured to implement a circuit design is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, DSP 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, XOR, NAND, NOR, and XNOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
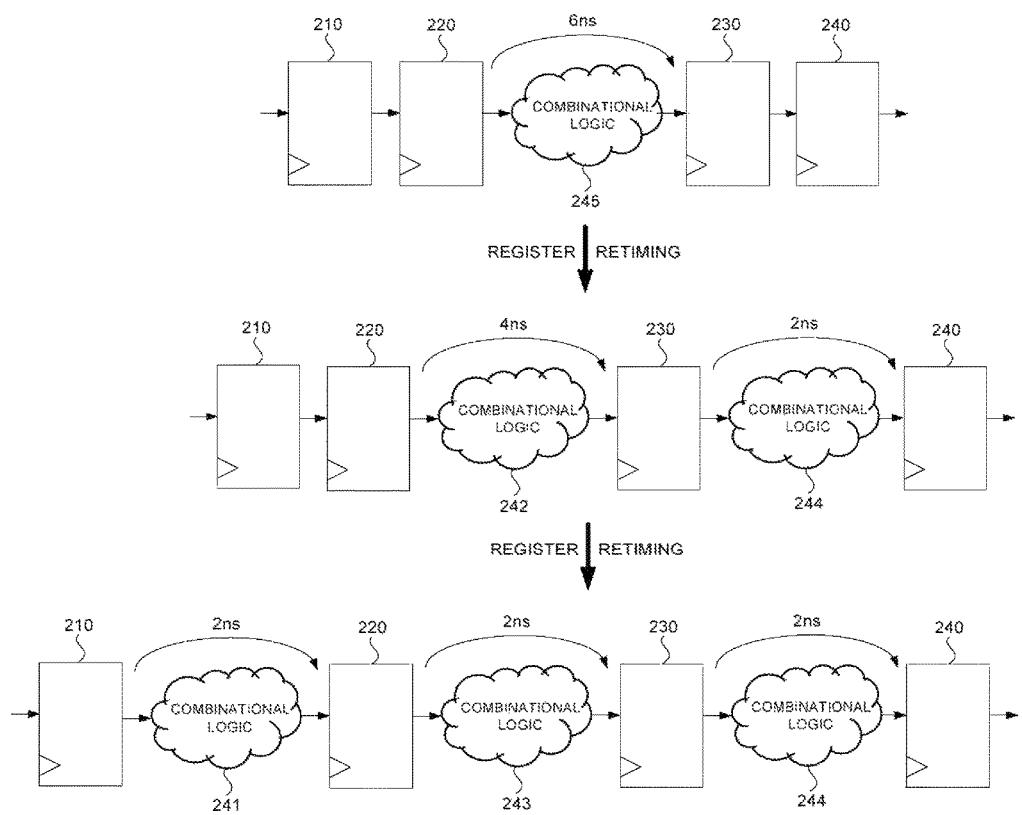
FIG. 2 is a diagram of illustrative register retiming operations in accordance with an embodiment.

FIG. 2 shows an example of different versions of a circuit design that PLD 100 may implement. The first version of the circuit design may include clocked storage circuits such as registers 210, 220, 230, and 240 and combinational logic 245.

Combinational logic 245 may include any digital logic that is implemented by Boolean circuits, whose outputs may asynchronously change as a function of only the present inputs. Examples of combinational logic may include AND, OR, XOR, NAND, NOR, and XNOR logic gates, inverters, pass gates, multiplexers, demultiplexers, look-up tables, logic arrays, etc. and any combination thereof.

In contrast, sequential logic may include any digital logic that is implemented by circuits, whose outputs may synchronously change at discrete times in response to a synchronization signal (e.g., a clock signal). Examples of sequential logic may include any clocked storage circuits such as registers (sometimes also referred to as flip-flops) or memories such as random-access memory (RAM), read-only memory (ROM), content-addressable memory (CAM), etc.

A circuit design element may include any combinational logic, sequential logic and/or wire in a circuit design. If desired, a delay may be associated with a circuit design element.

In the example of FIG. 2, register 210 may send a signal to register 220; register 220 may send the signal through combinational logic 240 to register 230; and register 230 may send the signal to register 240. As an example, the path from register 220 through combinational logic 245 to register 230 may have a delay of 6 ns (nanoseconds), whereas the path between registers 210 and 220 and between registers 230 and 240 may have a negligible delay of zero nanoseconds. Thus, the first version of the circuit design may operate at a frequency of 166 MHz.

Performing register retiming on the first version of the circuit design may create the second version of the circuit design. For example, register 230 may be pushed back through a portion of combinational logic 245, thereby separating combinational logic 245 of the first version of the circuit design into combinational logic 242 and 244 of the second version of the circuit design. In the second version of the circuit design, register 210 may send a signal to register 220; register 220 may send the signal through combinational logic 242 to register 230; and register 230 may send the signal through combinational logic 244 to register 240.

As an example, the path from register 220 through combinational logic 242 to register 230 may have a delay of 4 ns, and the path from register 230 through combinational logic 244 to register 240 may have a delay of 2 ns. Thus, the second version of the circuit design may operate at a frequency of 250 MHz.

Performing register retiming on the second version of the circuit design may create the third version of the circuit design. For example, register 220 may be pushed forward through a portion of combinational logic 242, thereby separating combinational logic 242 of the second version of the circuit design into combinational logic 241 and 243 of the third version of the circuit design. In the third version of the circuit design, register 210 may send a signal through combinational logic 241 to register 220; register 220 may send the signal through combinational logic 243 to register 230; and register 230 may send the signal through combinational logic 244 to register 240.

As an example, the paths from register 210 through combinational logic 241 to register 220, from register 220 through combinational logic 243 to register 230, and from register 230 through combinational logic 244 to register 240 may all have a delay of 2 ns. Thus, the third version of the circuit design may operate at a frequency of 500 MHz, which is thrice the frequency at which the first version of the circuit design may operate.

In some embodiments, registers may be pushed along a wire without being pushed forward or backward through combinational logic. For example, consider the scenario in which the wire from register 220 to combinational logic 242 of the second version of the circuit design has a delay of 2 ns and the path through combinational logic 242 to register 230 a delay of 2 ns. In this scenario, register 220 may be pushed along the wire closer to combinational logic 242, thereby achieving the same result (i.e., a worst case delay of 2 ns between registers 210, 220, 230, and 240) as in the third version of the circuit design without pushing register 220 through any combinational logic.

Thus, in order not to unnecessarily obscure the present embodiments, we refer to all register moves, including pushing a register forward or backward through combinational logic and pushing a register forward or backward along a wire, as a register retiming operation.

Figure 3:
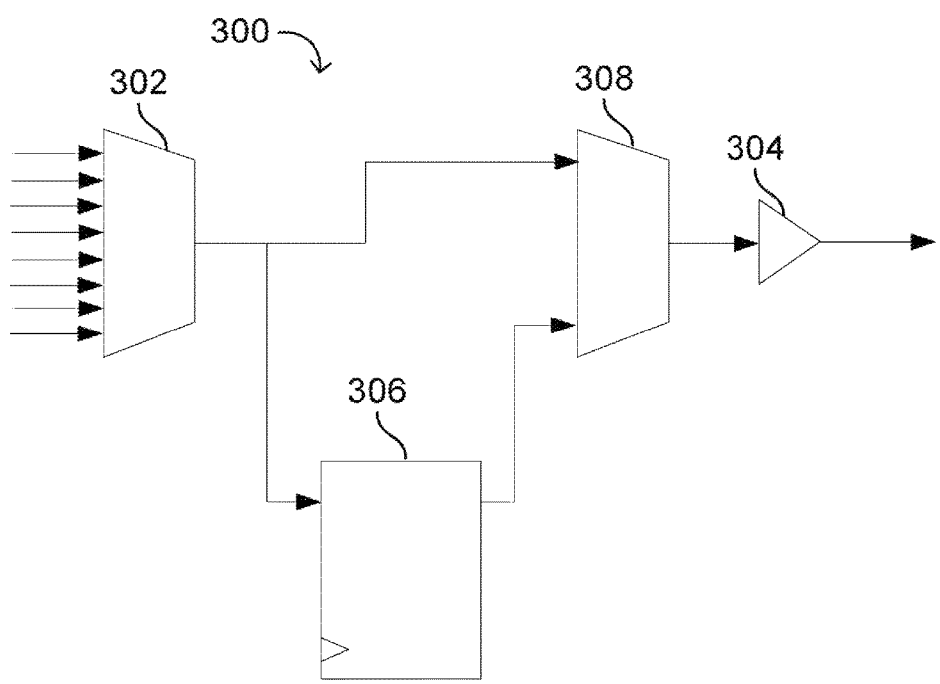
FIG. 3 is a diagram of an illustrative pipelined routing resource which uses a register to pipeline a routing signal in accordance with an embodiment.

If desired, routing resources such as the vertical routing channels 140 or the horizontal routing channels 150 of FIG. 1 may include pipeline elements, which can facilitate register retiming. FIG. 3 depicts a pipelined routing resource 300 which uses a register in accordance with an embodiment. As shown, the pipelined routing resource 300 includes a first multiplexer 302, a driver 304, a register 306, and a second multiplexer 308.

Multiplexer 302 may be a driver input multiplexer (DIM) or a functional block input multiplexer (FBIM). A DIM may select a signal from multiple sources and send the selected signal to driver 304 that drives the wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3, in accordance with an embodiment of the invention, the multiplexer 302 may be pipelined by providing its output to the data input of register 306. Multiplexer 308 in the pipelined routing resource 300 may receive the output of multiplexer 302 directly and may also receive the data output from register 306.

Although the pipelined routing resource 300 includes a register, it will be recognized by one skilled in the art that different register implementations may be used to store a routing signal such as an edge-triggered flip-flop, a pulse latch, a transparent-low latch, a transparent-high latch, just to name a few. Thus, in order not to unnecessarily obscure the present embodiments, we refer to the storage circuit in the pipelined routing resource as a pipeline storage element.

Multiplexer 308 may enable the pipelined routing resource 300 to be either used in a non-pipeline mode or in a pipeline register mode. In the non-pipeline mode, the output of multiplexer 308 selects the direct output of multiplexer 302.

In the pipeline register mode, multiplexer 308 may select the output of register 306. Multiplexer 308 may provide its output to driver circuit 304, and the output of driver circuit 304 may be used to drive a routing wire. The routing wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 306 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constrained to operate with a 650 ps clock cycle. Thus, providing a pipeline register such as register 306 every fourth wire may be sufficient in this example. Alternatively the registers may be placed more frequently than every fourth wire (e.g., every second wire) to provide a higher degree of freedom in selection of which registers are used.

Pipelined routing resources such as pipelined routing resource 300 may facilitate register retiming operations, such as the register retiming illustrated in FIG. 2. For example, consider the scenario in which register 230 is implemented by a first instance of a pipelined routing element that is operated in pipeline register mode (i.e., register 230 is implemented by register 306 of a first instance of a pipelined routing resource 300). Consider further that the path from register 220 through combinational logic 245 to register 230 includes a second instance of a pipelined routing element that is operated in non-pipeline mode. Thus, switching the first instance of the pipelined routing element from operating in pipeline register mode to operating in non-pipeline mode and switching the second instance of the pipelined routing element from operating in non-pipeline mode to operating in pipeline register mode may transform the first version into the second version of the circuit design presented in FIG. 2.

CAD tools in a circuit design system may evaluate whether register retiming may improve the performance of a current version of a circuit design or whether the current version of the circuit design meets a given performance criterion. If desired, and in the event that the CAD tools determine that register retiming would improve the performance of the current version of the circuit design or that the current version of the circuit design misses the given performance criterion, the CAD tools may execute register retiming operations that transform the current version of the circuit design into another version of the circuit design (e.g., as illustrated in FIG. 2).

Figure 4:
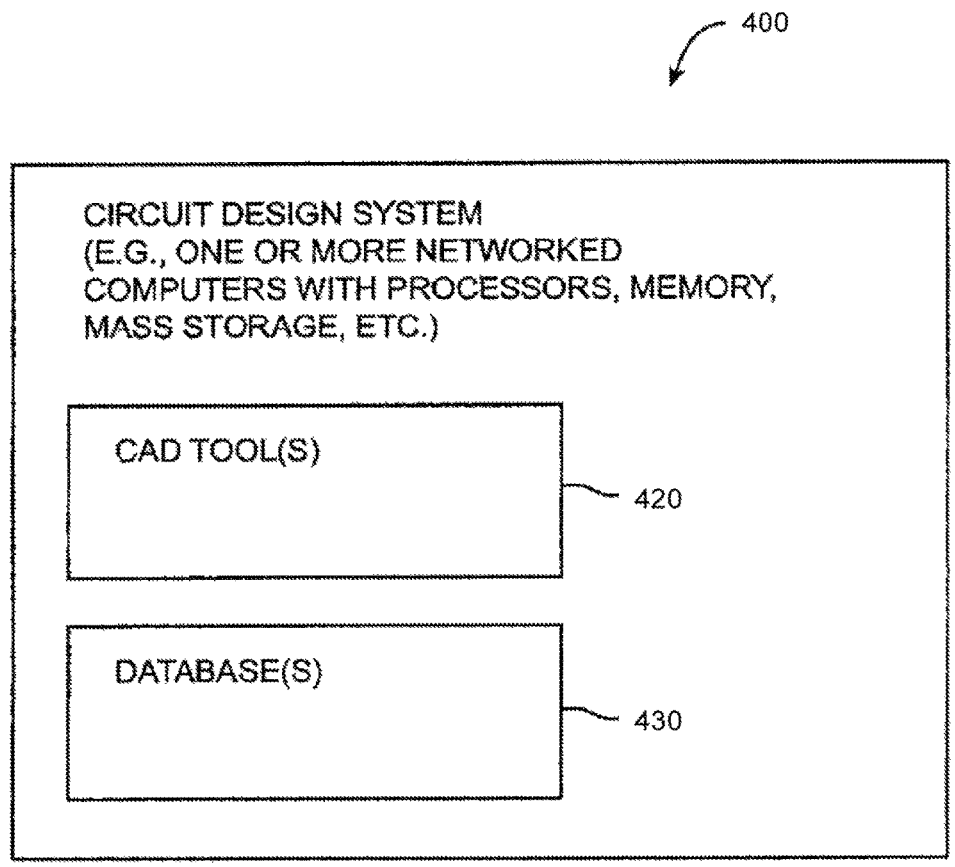
FIG. 4 is a diagram of an illustrative circuit design system that may be used to design integrated circuits in accordance with an embodiment.

An illustrative circuit design system 400 in accordance with an embodiment is shown in FIG. 4. System 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), blu-ray discs (BDs), other optical media, floppy diskettes, tapes, or any other suitable memory or storage device(s). When the software of system 400 is installed, the storage of system 400 has instructions and data that cause the computing equipment in system 400 to execute various methods (processes). When performing these processes, the computing equipment is configured to implement the functions of the circuit design system.

The computer aided design (CAD) tools 420, some or all of which are sometimes referred to collectively as a CAD tool, as an electronic design automation (EDA) tool, or as circuit design computing equipment may be provided by a single vendor or by multiple vendors. Tools 420 may be provided as one or more suites of tools (e.g., a compiler suite for performing tasks associated with implementing a circuit design in a programmable logic device) and/or as one or more separate software components (tools).

Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 5:
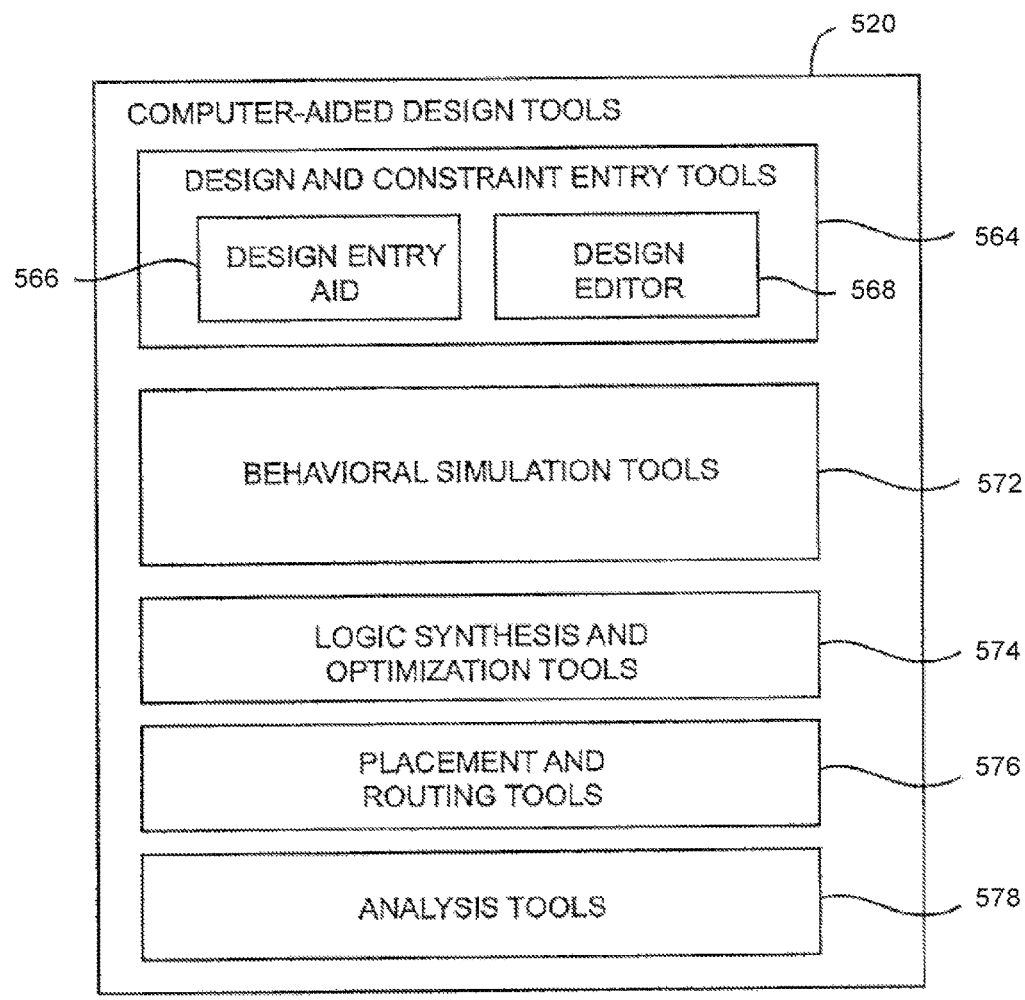
FIG. 5 is a diagram of illustrative computer-aided design (CAD) tools that may be used in a circuit design system in accordance with an embodiment.

Illustrative computer aided design tools 520 that may be used in a circuit design system such as circuit design system 400 of FIG. 4 are shown in FIG. 5.

The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imported from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564.

After logic synthesis and optimization using tools 574, the circuit design system may use tools such as placement and routing tools 576 to perform physical design steps (layout synthesis operations). Placement and routing tools 576 are used to determine where to place each gate of the gate-level netlist produced by tools 574. For example, if two counters interact with each other, the placement and routing tools 576 may locate these counters in adjacent regions to reduce interconnect delays or to satisfy timing requirements specifying the maximum permitted interconnect delay. The placement and routing tools 576 create orderly and efficient implementations of circuit designs for any targeted integrated circuit (e.g., for a given programmable integrated circuit such as a field-programmable gate array (FPGA).)

Tools such as tools 574 and 576 may be part of a compiler suite (e.g., part of a suite of compiler tools provided by a programmable logic device vendor). In accordance with the present invention, tools such as tools 574, 576, and 578 may also include timing analysis tools such as timing estimators. This allows tools 574 and 576 to satisfy performance requirements (e.g., timing requirements) before actually producing the integrated circuit.

As an example, tools 574 and/or 576 may perform register retiming operations on the circuit design based on the length of a combinational path between registers in the circuit design and corresponding timing constraints that were entered by the logic designer using tools 564. The register retiming operations may move registers through combinational logic (e.g., through logical AND, OR, XOR, etc. gates, look-up tables (LUTs), multiplexers, arithmetic operators, etc.) or along wires as described in FIG. 2. If desired, tools 574 and 576 may perform forward and backward pushes of registers by configuring pipelined routing resources such as pipelined routing resource 300 of FIG. 3 to operate in non-pipeline mode or in pipeline register mode.

In some scenarios, tools 576 may encounter a short path—long path problem in which a long path that would benefit from a register retiming operation is coupled in parallel to a short path that has no location to receive a register during the register retiming operation. As an example, consider the scenario in which the short path ends in a synchronization register that operates in a first clock domain and is placed adjacent to circuit design elements that operate in a second clock domain. The connection between the synchronization register and other registers that operate in the second clock domain is sometimes also referred to as a synchronization region.

In this scenario, tools 576 may perform a register retiming operation that moves a register from the first clock domain beyond the synchronization register into the synchronization region between the first and second clock domains and into the long path, thereby solving the short path - long path problem. As an example, tools 576 may perform register retiming operations into the synchronization region by configuring pipelined routing resources such as pipelined routing resource 300 of FIG. 3 in the synchronization region to operate in pipeline register mode.

After an implementation of the desired circuit design has been generated using placement and routing tools 576, the implementation of the design may be analyzed and tested using analysis tools 578. For example, analysis tools 578 may include timing analysis tools, power analysis tools, or formal verification tools, just to name few.

After satisfactory optimization operations have been completed using tools 520 and depending on the targeted integrated circuit technology, tools 520 may produce a mask-level layout description of the integrated circuit or configuration data for programming the programmable logic device.

Figure 6:
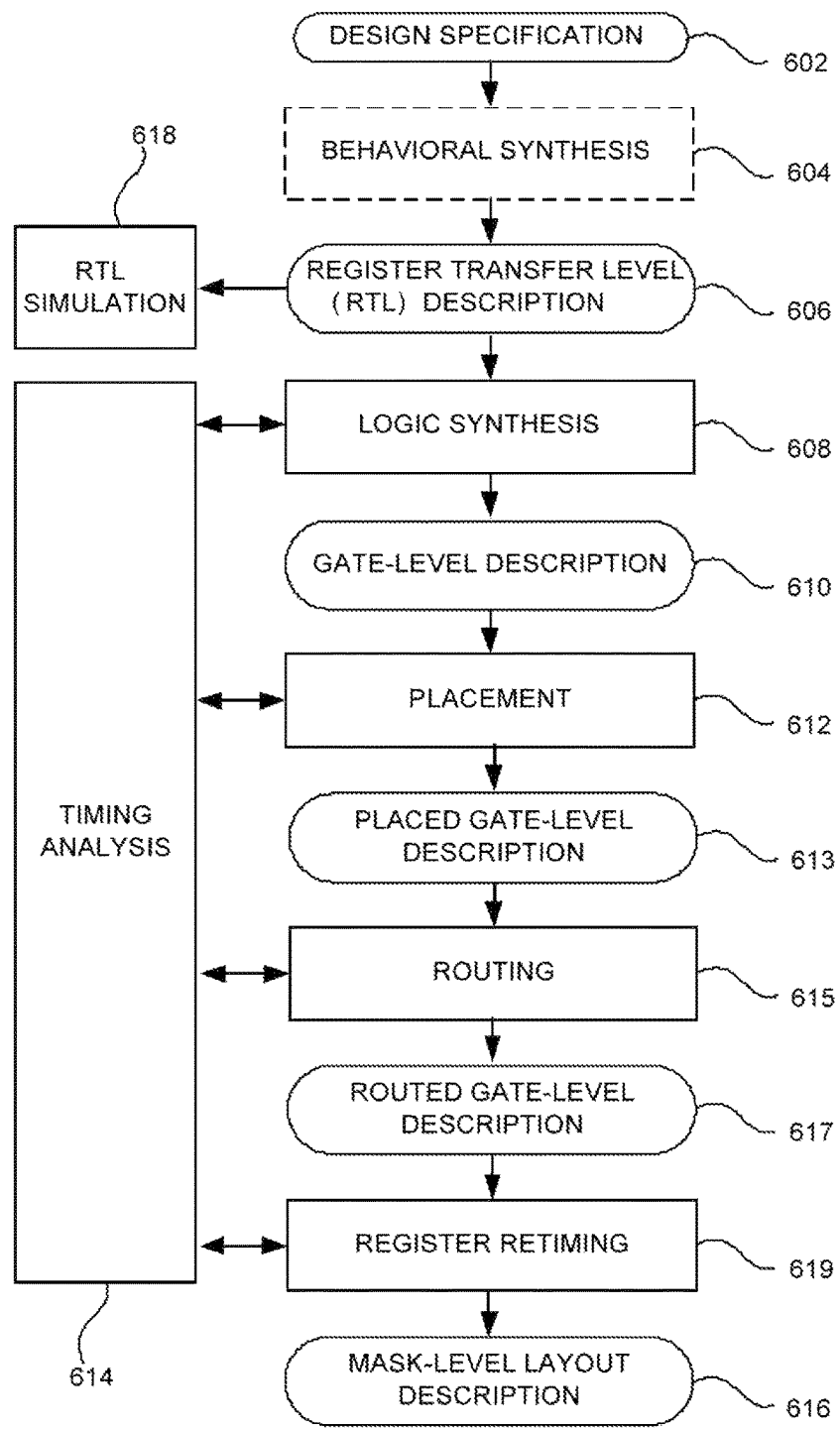
FIG. 6 is a flow chart of illustrative steps for designing an integrated circuit in accordance with an embodiment.

Illustrative operations involved in using tools 520 of FIG. 5 to produce the mask-level layout description of the integrated circuit are shown in FIG. 6. As shown in FIG. 6, a circuit designer may first provide a design specification 602. The design specification 602 may, in general, be a behavioral description provided in the form of an application code (e.g., C code, C++ code, SystemC code, OpenCL code, etc.). In some scenarios, the design specification may be provided in the form of a register transfer level (RTL) description 606.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

At step 604, behavioral synthesis (sometimes also referred to as algorithmic synthesis) may be performed to convert the behavioral description into an RTL description 606. Step 604 may be skipped if the design specification is already provided in form of an RTL description.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 5), to name a few.

In certain embodiments, a given data path may have more than one constraint associated with the path, and some of these constraints may be in conflict with each other (e.g., a constraint received with the behavioral design specification for a given path may conflict with the constraint received with the RTL description and with a constraint received with a constraint file). In this scenario, a predetermined priority of constraints, which may be defined explicitly or resolved implicitly by CAD tools 520, may determine which of the conflicting constraints is selected. For example, the constraint from the user or a configuration file may override the constraints received from other sources, whereas a constraint received with the RTL description may override a constraint received with the behavioral design specification.

The constraints may target the entire circuit design or portions of the circuit design. For example, some constraints may be defined globally and thus be applicable to the entire circuit design. Other constraints may be assigned locally and thus be applicable only to the corresponding portions of the circuit design.

Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools 520. For example, a constraint defined at a higher level of the design hierarchy may override a constraint at a lower level. Alternatively, a constraint defined at a lower level of the design hierarchy may override a constraint at a higher level, or individual levels of the design hierarchy may be given priority over other levels of design hierarchy.

Constraints included in design specification 602 or RTL description 606 may be conveyed to CAD tools 520 in the form of variables, parameters, compiler directives, macros, pragmas, or assertions, just to name a few. CAD tools 520 may use a constraint file, which may include a portion or all of the constraints. Such a constraint file may be included with design specification 602 or RTL description 606. In some scenarios, a portion or all of the constraints may be embedded in the circuit design. Alternatively, the constraints may have been defined using the design and constraint entry tools 564 (see FIG. 5).

At step 618, behavioral simulation tools 572 may perform an RTL simulation of the RTL description, which may verify the functional performance of the RTL description. If the functional performance of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 5. If desired, logic synthesis operations may perform register retiming as illustrated in FIG. 2 according to the constraints that are included in design specification 602 or RTL description 606. The output of logic synthesis 608 is gate-level description 610.

During step 612, placement operations using for example placement and routing tools 576 of FIG. 5 may place the different gates in gate-level description 610 in a preferred location on the targeted integrated circuit to meet given target criteria (e.g., minimize area and maximize routing efficiency or minimize path delay and maximize clock frequency or any combination thereof). The output of placement 612 is placed gate-level description 613.

During step 615, routing operations using for example placement and routing tools 576 of FIG. 5 may connect the gates from the placed gate-level description 613. Routing operations may attempt to meet given target criteria (e.g., minimize congestion, minimize path delay and maximize clock frequency or any combination thereof). The output of routing 615 is routed gate-level description 617.

During step 619, register retiming operations using for example placement and routing tools 576 of FIG. 5 may move registers in the routed gate-level description 617 as illustrated in FIG. 2 and according to the constraints that are included in design specification 602 or RTL description 606. As an example, register retiming operations may change the configuration of some pipelined routing resources (e.g., some instances of pipelined routing resource 300 of FIG. 3) from operating in pipeline register mode to operating in non-pipelined mode and the configuration of other pipelined routing resources (e.g., other instances of pipelined routing resources 300 of FIG. 3) from operating in non-pipelined mode to operating in pipeline register mode. The output of register retiming 619 is a mask-level layout description 616.

Circuit design system 400 (FIG. 4) may include a timing estimator (e.g., formed as part of optimization tools 574, tools 576, or tools 578) that may be used to estimate delays between synchronous elements of the circuit design during step 614. For example, the timing estimator may estimate delays between clocked storage elements such as registers and storage circuits (e.g., based on the lengths of interconnects, intermediate combinational logic, etc.). If desired, the steps logic synthesis 608, placement 612, routing 615, and register retiming 619 may invoke timing analysis 614 to estimate delays between clocked storage elements during the respective steps.

The delays may, if desired, be estimated based on metrics such as slack (e.g., the difference between a required arrival time and the arrival time of a signal), slack-ratios, interconnect congestion, or other timing metrics. Circuit design system 400 may use the estimated delays to determine the locations of groups of circuitry while helping to ensure that delays satisfy timing requirements (e.g., critical path delay requirements) or other performance constraints.

Consider the scenario in which a circuit design has a given path from a register through combinational logic to another register and that this given path misses one or more target criteria. The timing estimator may further determine that the given path is associated with a delay that is larger than the target delay specified for the path as one of the target criteria. For example, the timing estimator may detect that the given path has a delay that is larger than the target delay after routing 615. In this scenario, register retiming 619 may move registers (e.g., forward and/or backward through combinational logic and/or along wires), thereby reducing the delay between the registers and potentially improving the performance of the given path.

In the event that the given path is parallel to another path, register retiming 619 may duplicate the moved registers from the given path to the other path. The duplication of the moved registers from the given path to the other path may be unfeasible if the other path has no space to receive the registers.

Figure 7:
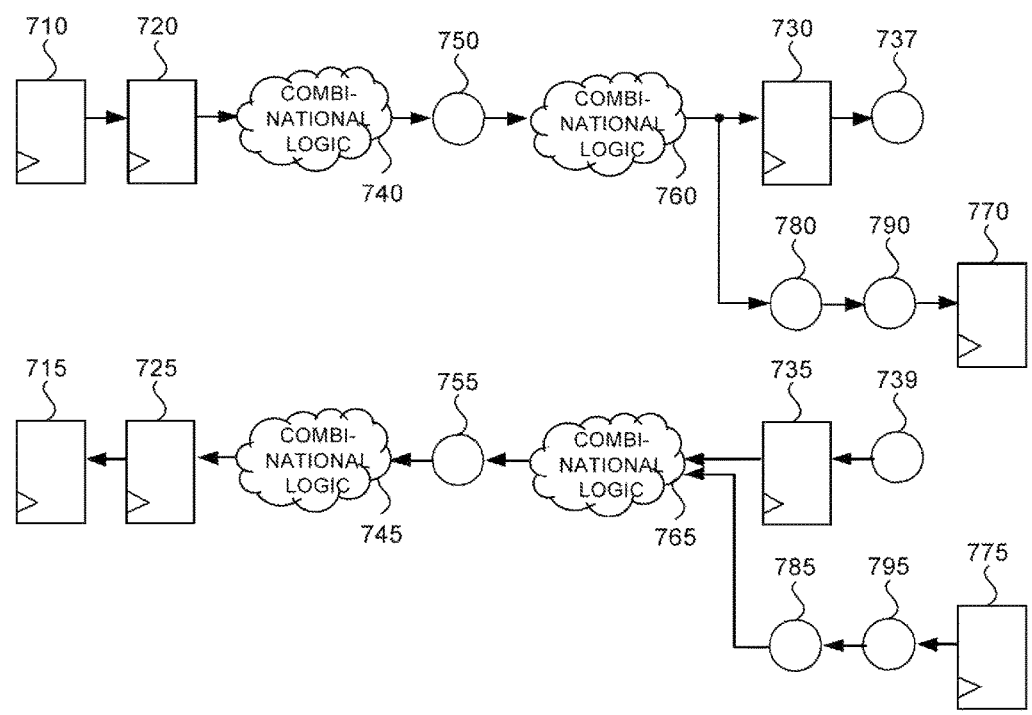
FIG. 7 is a diagram of an illustrative register retiming operation to solve the short path—long path problem in accordance with an embodiment.

The problem in which a timing critical long path is parallel to a non-timing critical short path that cannot receive a register during register retiming operations is sometimes also referred to as the short path—long path problem. FIG. 7 is a diagram of an illustrative register retiming operation to solve the short path—long path problem in accordance with an embodiment.

The first version of the circuit design (e.g., routed gate-level description 617 of FIG. 6) may include clocked storage circuits such as registers 710, 720, 730, and 770. The first version of the circuit design may further include combinational logic 740 and 760 and pipelined routing resource 737, 750, 780, and 790 configured in non-pipeline mode.

Combinational logic 740 and 760 may include any digital logic that is implemented by Boolean circuits, whose outputs may asynchronously change as a function of only the present inputs. Examples of combinational logic may include AND, OR, NAND, NOR, and XOR logic gates, inverters, pass gates, multiplexers, demultiplexers, look-up tables, logic arrays, etc. and any combination thereof.

In contrast, sequential logic may include any digital logic that is implemented by circuits, whose outputs may synchronously change at discrete times in response to a synchronization signal (e.g., a clock signal). Examples of sequential logic may include any clocked storage circuits such as registers or memories such as random-access memory (RAM), read-only memory (ROM), content-addressable memory (CAM), etc.

A circuit design element may include any combinational logic and/or sequential logic and/or wire in a circuit design. If desired, a delay may be associated with a circuit design element.

In the example of FIG. 7, register 710 may send a signal to register 720; register 720 may send the signal through combinational logic 740, pipelined routing resource 750, and combinational logic 760 to register 730 and additionally from combinational logic 760 through pipelined routing resources 780 and 790 that are both configured in non-pipeline mode to register 770.

Consider the scenario in which the long path from register 720 to register 770 is timing critical and the short path from register 720 to register 730 is not timing critical. In this scenario, a register retiming operation such as register retiming 619 of FIG. 6 may move register 720 forward through combinational logic 740 to pipelined routing resource 750 by connecting register 710 directly to combinational logic 740 and changing the configuration of pipelined routing resource 750 from operating in non-pipeline mode to operating in pipeline register mode.

As an example, consider that the long path from pipelined routing resource 750 to register 770 is still timing critical and that an additional register retiming operation may be required. In this example, a register retiming operation may move register 730 to pipelined routing resource 737, thereby liberating a space in the short path that may receive a register. Another register retiming operation may then move the register from pipelined routing resource 750 to pipelined routing resource 780 (e.g., by changing pipelined routing resource 750 from operating in pipeline register mode to operating in non-pipeline mode and by changing pipelined routing resource 780 from operating in non-pipeline mode to operating in pipeline register mode) and to the previous position of register 730 in the short path, thereby solving the short path—long path problem.

The second version of the circuit design (e.g., routed gate-level description 617 of FIG. 6) may include clocked storage circuits such as registers 715, 725, 735, and 775. The second version of the circuit design may further include combinational logic 745 and 765 and pipelined routing resource 739, 755, 785, and 795, all configured in non-pipeline mode.

Combinational logic 745 and 765 may include any digital logic that is implemented by Boolean circuits, whose outputs may asynchronously change as a function of only the present inputs. Examples of combinational logic may include AND, OR, NAND, NOR, and XOR logic gates, inverters, pass gates, multiplexers, demultiplexers, look-up tables, logic arrays, etc. and any combination thereof.

In contrast, sequential logic may include any digital logic that is implemented by circuits, whose outputs may synchronously change at discrete times in response to a synchronization signal (e.g., a clock signal). Examples of sequential logic may include any clocked storage circuits such as registers or memories such as random-access memory (RAM), read-only memory (ROM), content-addressable memory (CAM), etc.

A circuit design element may include any combinational logic and/or sequential logic and/or wire in a circuit design. If desired, a delay may be associated with a circuit design element.

In the example of the second version of the circuit design, registers 735 and 775 may each send a signal which may converge in combinational logic 765. The converged signal may traverse pipelined routing resource 755 and combinational logic 745 before reaching register 725; and register 725 may send the signal to register 715.

Consider the scenario in which the long path from register 775 to register 725 is timing critical and the short path from register 735 to register 725 is not timing critical. In this scenario, a register retiming operation such as register retiming 619 of FIG. 6 may move register 725 backward through combinational logic 745 to pipelined routing resource 755 by connecting register 715 directly to combinational logic 745 and changing the configuration of pipelined routing resource 755 from operating in non-pipeline mode to operating in pipeline register mode.

As an example, consider that the long path from register 775 to the register in pipelined routing resource 755 is still timing critical and that an additional register retiming operation may be required. In this example, a register retiming operation may move register 735 to pipelined routing resource 739, thereby liberating a space in the short path that may receive a register. Another register retiming operation may then move the register from pipelined routing resource 755 to pipelined routing resource 785 and to the previous position of register 735 in the short path, thereby solving the short path—long path problem.

In some embodiments, register 730 of the first version may operate in a first clock domain and connect through pipelined routing resource 737 to clocked storage elements that operate in a second clock domain that is different than the first clock domain. Similarly, register 735 of the second version may operate in a first clock domain and connect through pipelined routing resource 739 to clocked storage elements that operate in a second clock domain that is different than the first clock domain. A register that receives signals from clocked storage elements that operate in a different clock domain (e.g., register 735) is sometimes also referred to as a synchronization register. The circuit design elements between a register that operates in a first clock domain (e.g., registers 730 and 735) and circuit design elements that operate in a second clock domain are sometimes also referred to as circuit design elements in a synchronization region.

Figure 8:
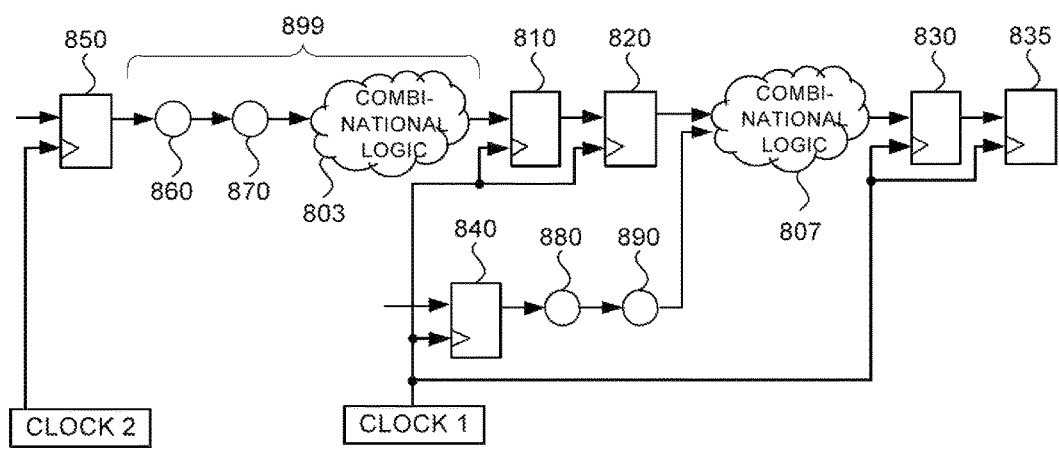
FIG. 8 is a diagram of an illustrative register retiming operation into the synchronization region between clock domains in accordance with an embodiment.

FIG. 8 is a diagram of an illustrative register retiming operation into the synchronization region between two clock domains in accordance with an embodiment. As shown, the circuit design of FIG. 8 includes a first portion that operates in a first clock domain and a second portion that operates in a second clock domain that is different than the first clock domain.

For example, combinational logic 807, pipelined routing resources 880 and 890 both configured in non-pipeline mode, and registers 810, 820, 830, 835, and 840 may operate in the first clock domain based on synchronization signal (or clock signal) CLOCK 1, whereas register 850 may operate in the second clock domain based on synchronization signal (or clock signal) CLOCK 2.

Combinational logic 803 and pipelined routing resources 860 and 870 configured in non-pipeline mode may form a synchronization region 899 between the two portions of the circuit design.

Register 850 may send a signal from the second portion of the circuit design through the synchronization region 899 (i.e., through pipelined routing resources 860 and 870 and combinational logic 803) to register 810 in the first portion of the circuit design. Register 810 may form a synchronization chain together with register 820 that performs metastability handling of the signal received from register 850.

For example, the signal that arrives at register 810 may transition from logic '0' to logic '1' at the rising edge of synchronization signal CLOCK 1. Due to the uncertainty of the almost simultaneously occurring events on the data and clock ports of register 810, the signal on the output of register 810 may become metastable at first and may take up to half a period of synchronization signal CLOCK 1 to resolve metastability. At the next rising edge of synchronization signal CLOCK 1, register 820 may store the signal from register 810, thereby producing a signal that is stable.

Register 840 may send a signal through pipelined routing resource 880 and 890 which may converge with the signal from register 820 in combinational logic 807. The converged signal may reach register 830 from the output of combinational logic 807; and register 830 may send the signal to register 835.

Consider the scenario in which the long path from register 840 to register 830 is timing critical and the short path from register 820 to register 830 is not timing critical. Consider further that the register retiming operation may be required to preserve the metastability handling performed by the synchronization chain formed from registers 810 and 820. In other words, the register retiming operation may move a register from the first portion of the circuit design into the synchronization region 899 only if the move preserves the metastability handling of the synchronization chain.

In this scenario, the register retiming operation may move register 810 backwards into the synchronization region 899 through combinational logic 803 to pipelined routing resource 870. For example, the register retiming operation may change pipelined routing resource 870 from operating in non-pipeline mode to operating in pipeline register mode. The register retiming operation may further move register 820 to the former position of register 810 and register 830 backwards through combinational logic 807 to the former position of register 820 and to pipelined routing resource 890 (e.g., by changing pipelined routing resource 890 from operating in non-pipeline mode to operating in pipeline register mode) in the parallel long path.

After the register retiming operation, the previous long path from register 840 to register 830, which now has a first portion from register 840 to pipelined routing resource 890 and from pipelined routing resource 890 to register 835, may no longer be timing critical. In other words, the register retiming operation may have solved the short path—long path problem by moving registers from the first portion of the circuit design into the synchronization region 899, while preserving the metastability handling of the synchronization chain.

In some scenarios, the register retiming operation may move registers from both the first and second portions of the circuit design into the synchronization region between clock domains. As shown, the circuit design of FIG. 9 includes a first portion that operates in a first clock domain and a second portion that operates in a second clock domain that is different than the first clock domain. In some scenarios, the first and second clock domains may be asynchronous to each other. In other words, the first clock domain may operate based on a first synchronization signal (e.g., a first clock signal), whereas the second clock domain operates based on a second synchronization signal (e.g., a second clock signal) that is not phase aligned with the first synchronization signal.

As an example, combinational logic 807, pipelined routing resources 880 and 890 both configured in non-pipeline mode, and registers 810, 820, 830, 835, and 840 may operate in the first clock domain based on synchronization signal (or clock signal) CLOCK 1, whereas registers 950 and 955 may operate in the second clock domain based on synchronization signal (or clock signal) CLOCK 2. Pipelined routing resources 960, 965, 970, and 975 configured in non-pipeline mode may form synchronization region 999 between the two portions of the circuit design.

Consider the scenario in which the register retiming operation may move register 955 forward into synchronization region 999 to pipelined routing resource 970. For example, the register retiming operation may change pipelined routing resource 970 from operating in non-pipeline mode to operating in pipeline register mode and clocked by synchronization signal CLOCK 2.

Furthermore, the register retiming operation may move register 810 to pipelined routing resource 975. However, the register retiming operation may not move register 810 to pipelined routing resource 970, because pipelined routing resource 970 already implements register 955; and the register retiming operation may not move register 810 to pipelined routing resources 960 or 965, because pipelined routing resources 960 and 965 are on a path between two registers within the second clock domain.

In some embodiments, the register retiming operation may operate on a graph. For example, the register retiming operation may create a constraint graph based on inequalities stemming from basic constraints, which ensure a non-negative number of registers on an arc, timing constraints (e.g., from performing timing analysis 614 of FIG. 6) which ensure that actual timing meets or exceeds timing requirements (e.g., by requiring that at least one register is added to the circuit at a position that is associated with the arc), and architecture constraints, which may limit register retiming to the number of available registers (e.g., the number of routing registers or pipelined routing resources) on any connection between nodes.

The register retiming operation may solve the system of inequalities by using a shortest path algorithm on the constraint graph. In some embodiments, the register retiming operation may use the Bellman-Ford algorithm for solving the single-source shortest path problem when edge weights may be negative. The system of inequalities may have a solution (i.e., all constraints can be met simultaneously) if and only if the constraint graph contains no negative cycles.

If a solution to the inequalities exists, the register retiming operation may determine the solution by representing the constraints as an integer linear programming (ILP) problem, if desired. As an example, the register retiming operation may use the simplex method to solve the ILP problem.

In some embodiments, the register retiming operation may generate a separate graph for each clock domain, thereby performing register retiming separately for the portions of the circuit design that operate in different clock domains. If desired, the register retiming operation may assign elements from a first portion of synchronization region 999 to the first portion of the circuit design that operates in the first clock domain and a second portion of synchronization region 999 that does not overlap with the first portion of synchronization region 999 to the second portion of the circuit design that operates in the second clock domain.

For example, the register retiming operation may assign pipelined routing resources 970 and 975 of synchronization region 999 to the portion of the circuit design that operates in the first clock domain (i.e., the portion of the circuit design that includes combinational logic 807, pipelined routing resources 880 and 890 both configured in non-pipeline mode, and registers 810, 820, 830, 835, and 840) and pipelined routing resources 960 and 965 to the portion of the circuit design that operates in the second clock domain (i.e., the portion of the circuit design that includes registers 950 and 955). If desired, the register retiming operation may create two separate constraint graphs, one for the portion of the circuit design that operates in the first clock domain, which now includes pipelined routing resources 970 and 975, and another one for the portion of the circuit design that operates in the second clock domain, which now includes pipelined routing resources 960 and 965, and determine a register retiming solution separately for each clock domain using the two graphs.

Thus, the register retiming operation may prevent that a register from the first clock domain is moved into synchronization region 999 past a register that was moved there from the second clock domain and vice versa.

If desired, the register retiming operation may preserve the graph during multiple register moves. As an example, consider the scenario in which the register retiming operation has moved register 955 to pipelined routing resource 970 and that timing analysis has created an arc from register 950 to pipelined routing resource 970 that requires the insertion of an additional register between register 950 and pipelined routing resource 970, because the path from register 950 to 970 is timing critical with regard to synchronization signal CLOCK 2.

In this example, the register retiming operation may move register 950 closer to pipelined routing resource 970 or the register from pipelined routing resource 970 closer to register 950 (e.g., to pipelined routing resource 960 or to the former position of register 955). In some embodiments, a pipelining operation may insert an additional register between register 950 and pipelined routing resource 970 (e.g., by changing pipelined routing resource 960 and/or pipelined routing resource 965 from operating in non-pipeline mode to operating in register pipeline mode) even though the insertion of the additional register may not be required, because the pipelined routing resources lie in synchronization region 999 between two asynchronous portions of the circuit design.

In some embodiments, the register retiming operation may re-build the graph after register 955 has been moved to pipelined routing resource 970, thereby implicitly considering registers 950 and 955 and pipelined routing resources 960, 965, and 970 as part of the second clock domain. In other words, the register retiming operation may have implicitly extended the portion of the circuit that operates in the second clock domain to pipelined routing resource 970 and any update to the graph of the second clock domain may from now on include a timing arc that extends to pipelined routing resource 970.

Thus, even after moving the register from pipelined routing resource 970 back closer to register 950, the register retiming operation may still move that register back to pipelined routing resource 970, because of the arc from register 950 to pipelined routing resource 970. In other words, register 955 may get stuck at pipelined routing resource 970 because of the register retiming operation. Similarly, the pipelining operation may still insert an additional register by configuring pipelined routing resource 960 and/or pipelined routing resource 965 accordingly, because of the timing arc from register 950 to pipelined routing resource 970.

Thus, in some embodiments, the register retiming operation may limit the distance by which a register may be moved into a synchronization region (e.g., by limiting the delay of the longest path that starts and/or ends in the register that is placed in the synchronization region, by limiting the number of pipelined routing resources by which the register may be moved into the synchronization region, by limiting the number of routing hops by which a register may be moved into the synchronization region, by limiting the number of circuit design elements from the synchronization region that are assigned to one or the other circuit design portion, or any combination thereof, just to name a few). For example, the register retiming operation may assign pipelined routing resources 970 and 975 as being available slots for receiving registers from the first portion of the circuit design and assign pipelined routing resources 960 and 965 as being available slots for receiving registers from the second portion of the circuit design.

Figure 10:
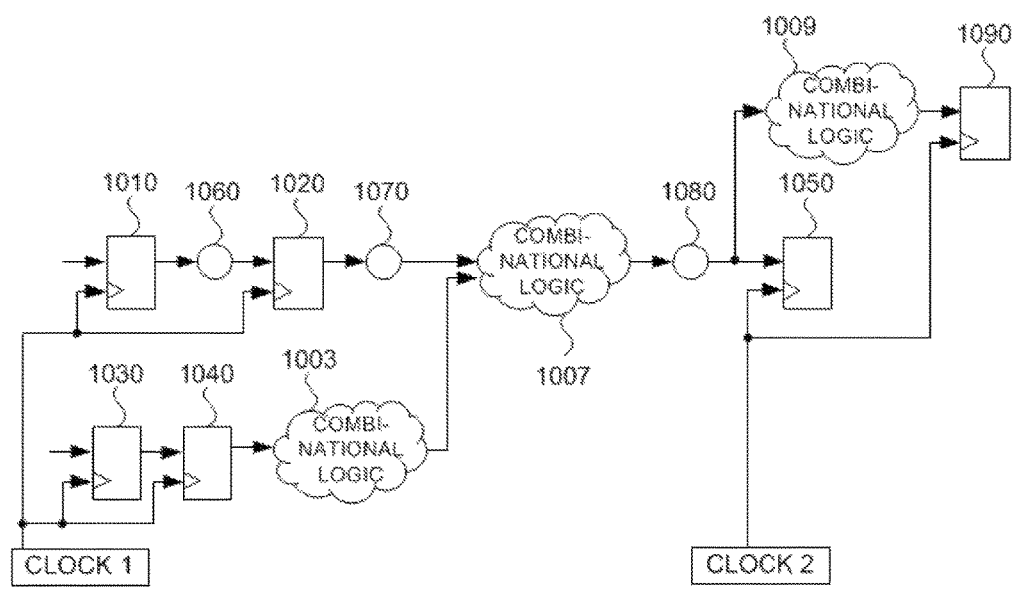
FIG. 10 is a diagram of an illustrative register retiming operation into the synchronization region between two clock domains that may lead to a new critical path in accordance with an embodiment.

In some embodiments, the register retiming operation may prevent the creation of a timing critical path caused by moving a register into the synchronization region between two clock domains. FIG. 10 is a diagram of an illustrative register retiming operation into the synchronization region between two clock domains that may lead to a new critical path in accordance with an embodiment.

As shown, the circuit design of FIG. 10 includes a first portion that operates in a first clock domain and a second portion that operates in a second clock domain that is different than the first clock domain.

For example, pipelined routing resource 1060 configured in non-pipeline mode, and registers 1010, 1020, 1030, and 1040 may operate in the first clock domain based on synchronization signal (or clock signal) CLOCK 1, whereas registers 1050 and 1090 may operate in the second clock domain based on synchronization signal (or clock signal) CLOCK 2. Combinational logic 1003, 1007, and 1009 and pipelined routing resources 1070 and 1080 configured in non-pipeline mode may form a synchronization region between the two portions of the circuit design.

Consider the scenario in which the register retiming operation moves registers 1020 and 1040 through combinational logic 1007 to pipelined routing resource 1080. In this scenario, the path from register 1030 to pipelined routing resource 1080, which was previously assigned to be placed in the synchronization region between clock domains and thus was not intended to support timing closure, may be a new timing critical path inside the first clock domain.

In some embodiments, the register retiming operation may limit the circuit design elements through which a register may be moved forward into the synchronization region based on the number of inputs of the circuit design element. For example, the register retiming operation may move a register forwards only through circuit design elements that have a fanin of one. In the example of FIG. 10, register 1020 may be moved forward to pipelined routing resource 1070, but not through combinational logic 1007, because combinational logic 1007 has a fanin of two.

Similarly, the register retiming operation may limit the circuit design elements through which a register may be moved backward into the synchronization region based on the number of outputs of the circuit design element. For example, the register retiming operation may move a register backwards through circuit design elements that have a fanout of one. In the example of FIG. 10, register 1050 may not be moved backward to pipelined routing resource 1080, because pipelined routing resource 1080 has a fanout of two.

Figure 11:
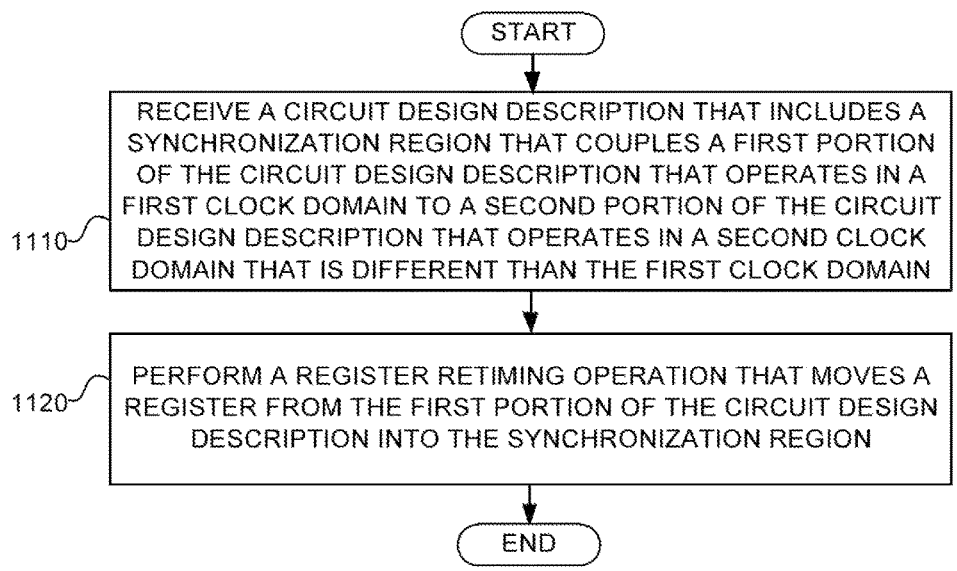
FIG. 11 is a flow chart of illustrative steps for performing a register retiming operation that moves a register into the synchronization region between two clock domains in accordance with an embodiment.

FIG. 11 is a flow chart of illustrative steps for performing a register retiming operation with circuit design computing equipment. The register retiming operation may move a register into the synchronization region between two clock domains in accordance with an embodiment.

Figure 9:
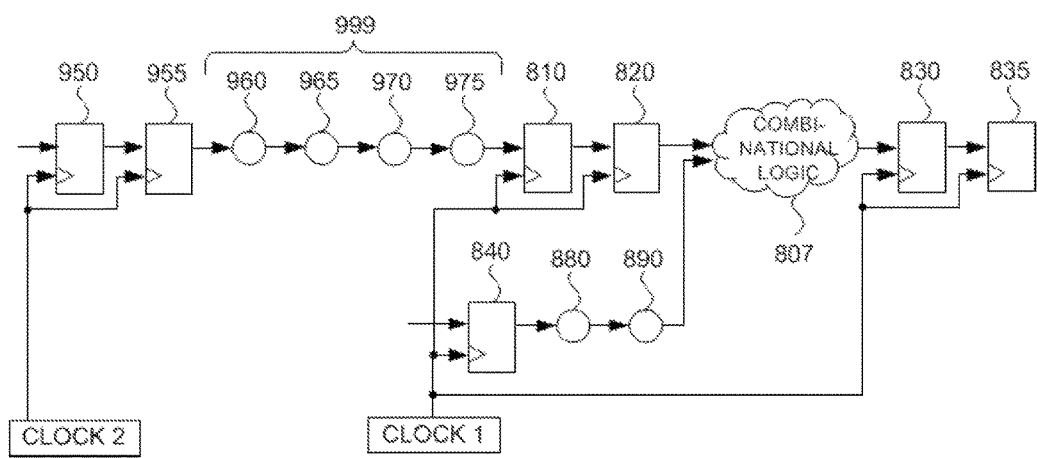
FIG. 9 is a diagram of an illustrative register retiming operation that may lead to a stuck register in the synchronization region between clock domains in accordance with an embodiment.

During step 1110, the circuit design computing equipment may receive a circuit design description that includes a synchronization region that couples a first portion of the circuit design description that operates in a first clock domain to a second portion of the circuit design description that operates in a second clock domain that is different than the first clock domain. Examples of such circuit design descriptions are shown in FIGS. 8, 9, and 10.

During step 1120, the circuit design computing equipment may perform a register retiming operation that moves a register from the first portion of the circuit design description into the synchronization region. For example, the circuit design computing equipment may move register 810 from the first portion of the circuit design of FIG. 8 into the synchronization region to pipelined routing resource 870.

Figure 12:
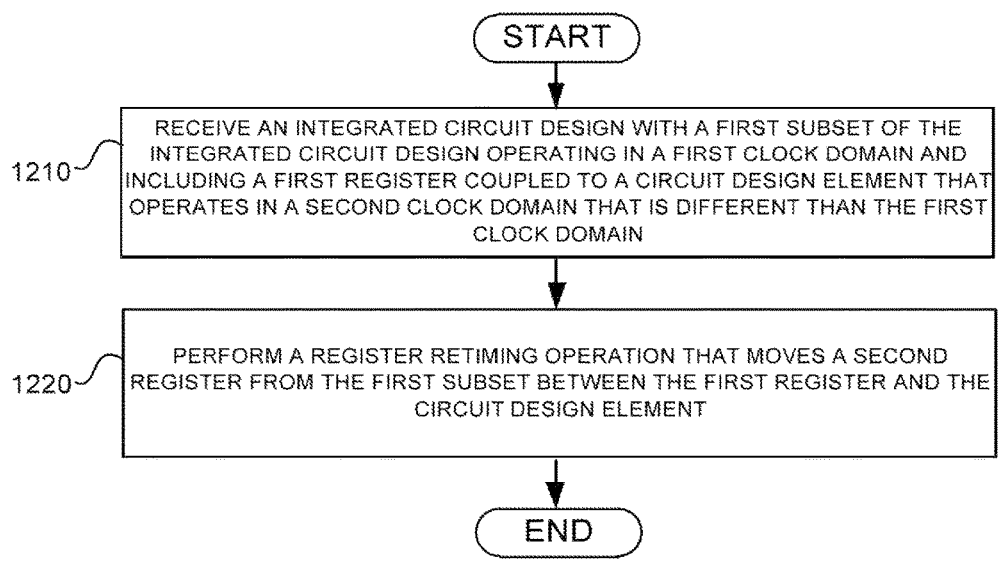
FIG. 12 is a flow chart of illustrative steps for performing a register retiming operation that moves a register past a synchronization register in accordance with an embodiment.

FIG. 12 is a flow chart of illustrative steps for performing a register retiming operation with circuit design computing equipment. The register retiming operation may move a register past a synchronization register in accordance with an embodiment.

During step 1210, the circuit design computing equipment may receive an integrated circuit design with a first subset of the integrated circuit design operating in a first clock domain and including a first register coupled to a circuit design element that operates in a second clock domain that is different than the first clock domain. Examples of such integrated circuit designs are shown in FIGS. 8, 9, and 10.

During step 1220, the circuit design computing equipment may perform a register retiming operation that moves a second register from the first subset between the first register and the circuit design element.

Figure 13:
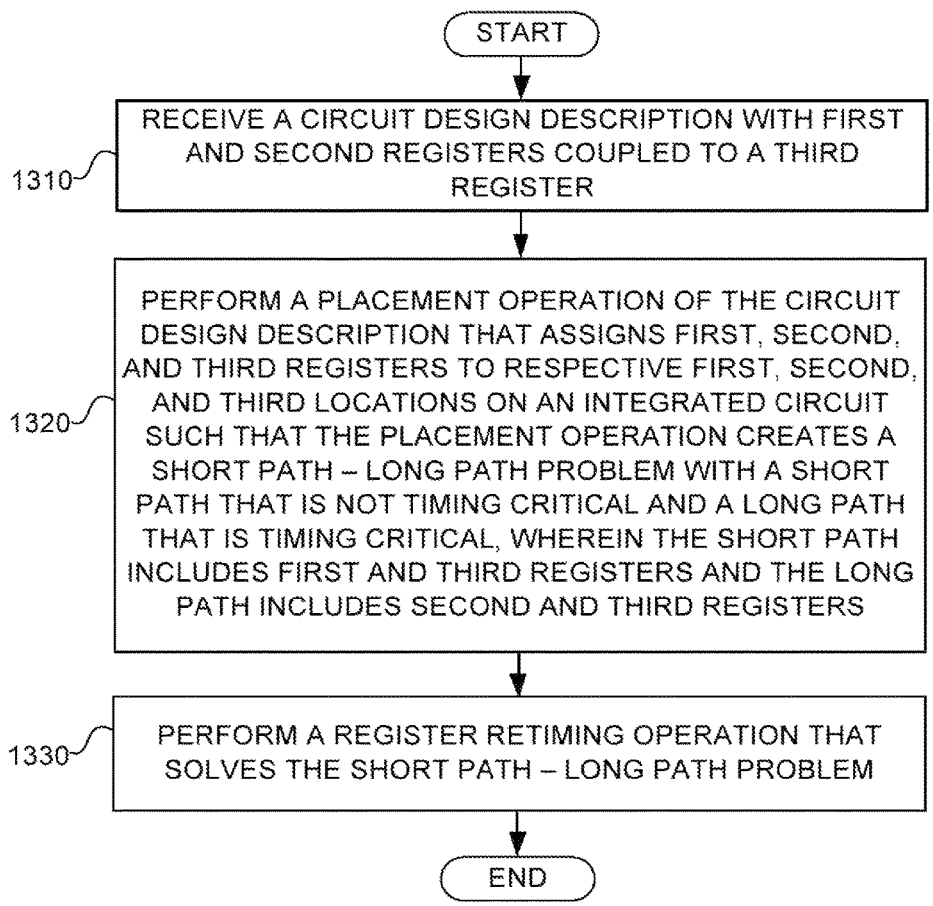
FIG. 13 is a flow chart of illustrative steps for solving the short path—long path problem in accordance with an embodiment.

FIG. 13 is a flow chart of illustrative steps for solving the short path—long path problem in accordance with an embodiment. Non-transitory computer-readable storage media may store instruction for performing a compilation of a circuit design description. If desired, a compiler may perform these illustrative steps.

During step 1310, the compiler may receive a circuit design description with first and second registers coupled to a third register. During step 1320, the compiler may perform a placement operation of the circuit design description that assigns first, second, and third registers to respective first, second, and third locations on an integrated circuit such that the placement operation creates a short path—long path problem with a short path that is not timing critical and a long path that is timing critical. The short path may include first and third registers; and the long path may include second and third registers. Examples of short path—long path problems are shown in FIG. 7.

During step 1330, the compiler may perform a register retiming operation that solves the short path—long path problem. Examples of register retiming operations that solve the short path—long path problem are shown in FIGS. 8 and 9.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of performing register retiming operations is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented in any suitable combination.

What is claimed is:

1. A method for operating circuit design computing equipment, comprising:
   with the circuit design computing equipment, receiving a circuit design description that includes a synchronization region that couples a first portion of the circuit design description operating in a first clock domain to a second portion of the circuit design description operating in a second clock domain that is different than the first clock domain;

with the circuit design computing equipment, performing a register retiming operation that moves a register from the first portion of the circuit design description into the synchronization region, wherein the register is assigned to a pipelined routing resource in the first portion of the circuit design description and wherein performing the register retiming operation further comprises setting the pipelined routing resource to operating in non-pipeline mode with the circuit design computing equipment; and configuring an integrated circuit using the retimed circuit design description.

2. The method of claim 1, further comprising:

with the circuit design computing equipment, switching another pipelined routing resource in the synchronization region from operating in non-pipeline mode to operating in pipeline register mode.

3. The method of claim 1, further comprising:

forming a synchronization chain prior to performing the register retiming operation by placing additional registers of the first portion of the circuit design description between the first portion of the circuit design description and the synchronization region.

4. The method of claim 3, wherein the second portion of the circuit design description sends signals to the first portion of the circuit design description, wherein the synchronization chain performs metastability handling of the signals, and wherein the register retiming operation preserves the metastability handling.

5. The method of claim 4, wherein preserving the metastability handling further comprises:

with the circuit design computing equipment, moving the register from the first portion of the circuit design description into the synchronization region without altering the synchronization chain.

6. The method of claim 1, wherein the register is assigned to a first predetermined position in the synchronization region, further comprising:

performing another register retiming operation that moves another register from the second portion of the circuit design description into a second predetermined position in the synchronization region.

7. The method of claim 6, wherein the second predetermined position in the synchronization region lies between the first predetermined position and the second portion of the circuit design description.

8. The method of claim 1, wherein the register retiming operation duplicates the register from the synchronization region to a parallel path.

9. The method of claim 1, wherein first clocked storage circuits in the first clock domain are controlled by a first synchronization signal, wherein second clocked storage circuits in the second clock domain are controlled by a second synchronization signal, and wherein the first and second synchronization signals are asynchronous to each other.

10. A method for operating circuit design computing equipment, comprising:

with the circuit design computing equipment, receiving a circuit design description that includes a synchronization region that couples a first portion of the circuit design description operating in a first clock domain to a second portion of the circuit design description operating in a second clock domain that is different than the first clock domain, wherein the synchronization region is not part of the first and second clock domains;

with the circuit design computing equipment, performing a register retiming operation that moves a register from the first portion of the circuit design description into the synchronization region;

limiting the distance by which the register is moved into the synchronization region according to a predetermined criterion; and configuring an integrated circuit using the retimed circuit design description.

11. The method of claim 10, wherein the register is assigned to a predetermined position in the synchronization region, and wherein the predetermined criterion that limits the move of the register into the synchronization region is selected from the group consisting of: a maximum number of inputs of a circuit element in the synchronization region between the predetermined position and the first portion of the circuit design description, a maximum number of outputs of a circuit element in the synchronization region between the predetermined position and the first portion of the circuit design description, a maximum number of circuit elements in the synchronization region between the predetermined position and the first portion of the circuit design description, a maximum delay between a pair of synchronous circuit elements in the synchronization region between the predetermined position and the first portion of the circuit design description, and a maximum number of additional registers previously moved from the first portion of the circuit design description into the synchronization region.

12. A method for operating circuit design computing equipment to perform a register retiming operation for an integrated circuit design, comprising:

with the circuit design computing equipment, receiving the integrated circuit design, wherein a first subset of the integrated circuit design operates in a first clock domain and includes a first register coupled to a clocked storage circuit in a second subset of the integrated circuit design that operates in a second clock domain that is different than the first clock domain;

with the circuit design computing equipment, performing a register retiming operation that moves a second register from the first subset between the first register and the clocked storage circuit, wherein the first register is part of a synchronization chain that performs metastability prevention and wherein the register retiming operation preserves the metastability prevention; and configuring an integrated circuit using the retimed integrated circuit design.

13. The method of claim 12, wherein the first clock domain operates based on a first clock signal, and wherein the second clock domain operates based on a second clock signal that is different than the first clock signal.

14. The method of claim 13, wherein the first and second clock signals are not phase aligned.

15. The method of claim 12, wherein the register retiming operation enables a frequency increase in the first clock domain.

16. The method of claim 12, wherein the first register is on a non-critical path.

17. The method of claim 16, further comprising:

duplicating the second register into a critical path that is parallel to the non-critical path.

18. The method of claim 12, further comprising:
performing another register retiming operation that moves a third register from the second subset of the integrated circuit design that operates in the second clock domain.

19. The method of claim 18, wherein the other register retiming operation places the third register between the second register and the second subset.

* * * * *